C. T. HENTSCHEL.
ELECTRIC SWITCH.
APPLICATION FILED JULY 25, 1917.

1,378,454.

Patented May 17, 1921.
2 SHEETS—SHEET 1.

Inventor:
Charles T. Hentschel,
by Albert G. Davis
His Attorney.

C. T. HENTSCHEL.
ELECTRIC SWITCH.
APPLICATION FILED JULY 25, 1917.
1,378,454.
Patented May 17, 1921.
2 SHEETS—SHEET 2.
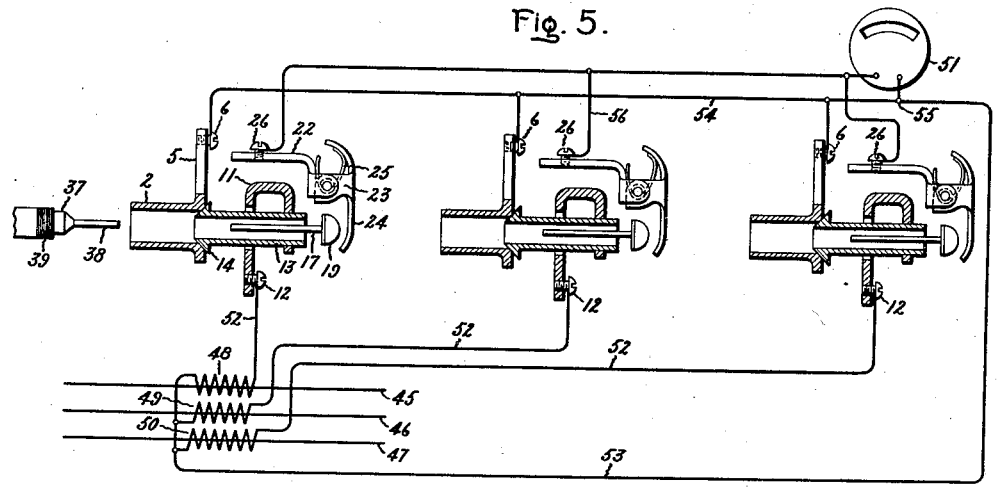
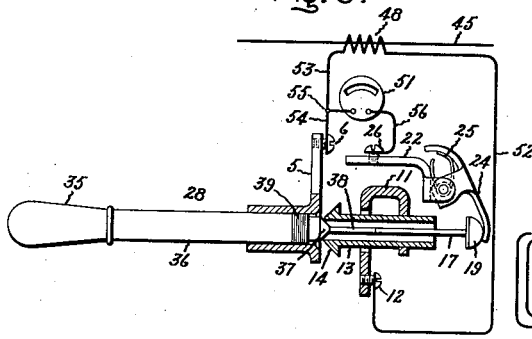
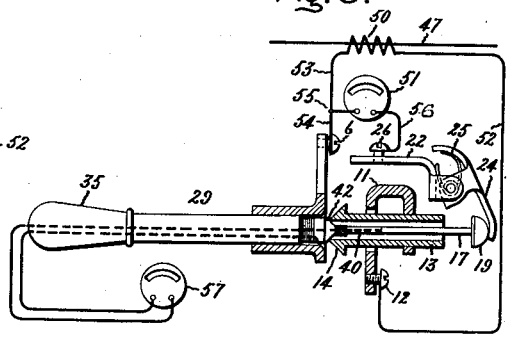
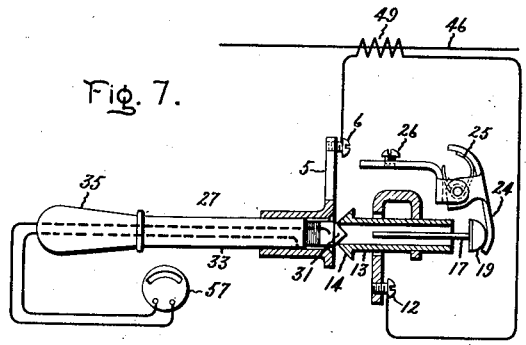
Inventor:
Charles T. Hentschel,
by Albert G. Davis
His Attorney.

UNITED STATES PATENT OFFICE.

CHARLES T. HENTSCHEL, OF SCHENECTADY, NEW YORK, ASSIGNOR TO GENERAL ELECTRIC COMPANY, A CORPORATION OF NEW YORK.

ELECTRIC SWITCH.

1,378,454.     Specification of Letters Patent.     Patented May 17, 1921.

Application filed July 25, 1917. Serial No. 182,780.

*To all whom it may concern:*

Be it known that I, CHARLES T. HENTSCHEL, a citizen of the United States, residing at Schenectady, in the county of Schenectady, State of New York, have invented certain new and useful Improvements in Electric Switches, of which the following is a specification.

My invention relates to electric switches and has for its object to provide a combined testing, calibrating and transfer switching device for use with measuring instruments and operative from the front of a switchboard, the device having no exposed live parts.

In systems of electrical distribution, when it is desirable to connect measuring instruments, such, for instance, as ammeters, to measure the current flowing in one or more circuits or one or more conductors of a polyphase system, it is the usual practice to provide an ammeter in common to all the circuits or conductors with means for connecting the ammeter through the usual transformers to any circuit or conductor of the system desired. Furthermore, it is often necessary in such systems to test the accuracy or calibrate the measuring instrument from time to time and also to test the current flowing in any conductor or circuit in cases where no permanently installed measuring instrument is used and for such purposes it is customary to provide separate and independent means for connection at the rear of the switchboard to the conductors to be tested or the instrument to be calibrated.

By my invention, I provide a switching device or means which is of simple construction, which never permits a transformer secondary to become open-circuited and which is operative to either transfer a permanently connected common measuring instrument from one conductor or circuit to another, calibrate or test the measuring instrument, test the current flowing in any conductor or circuit when no permanently connected instrument is used or perform these functions simultaneously.

The novel features which I believe to be characteristic of my invention will be definitely indicated in the appended claims, while the features of construction and mode of operation will be understood by reference to the following description taken in connection with the accompanying drawings which show the preferred embodiments of my invention and in which:—

Figure 1:
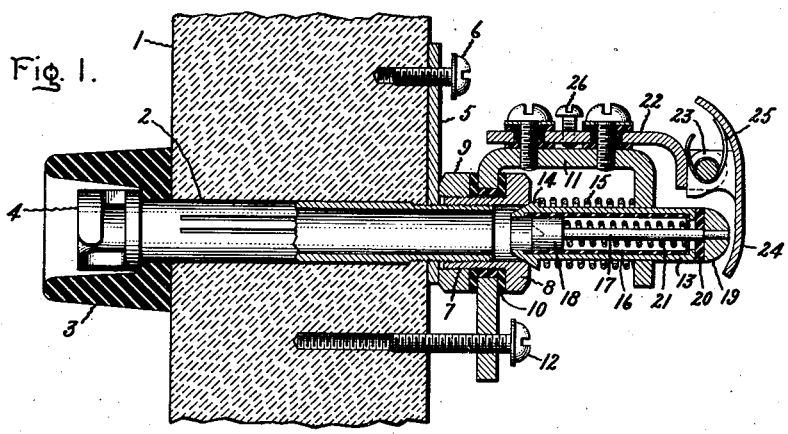
Figure 2:
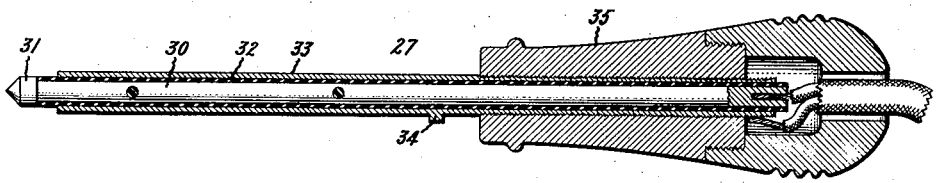
Figure 3:
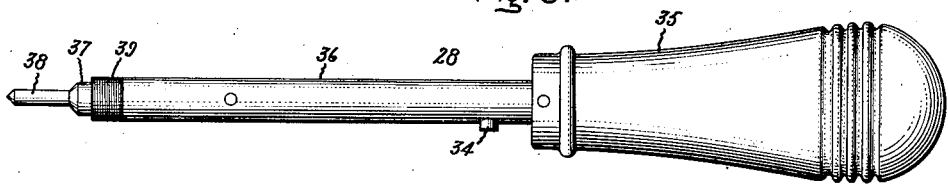
Figure 4:
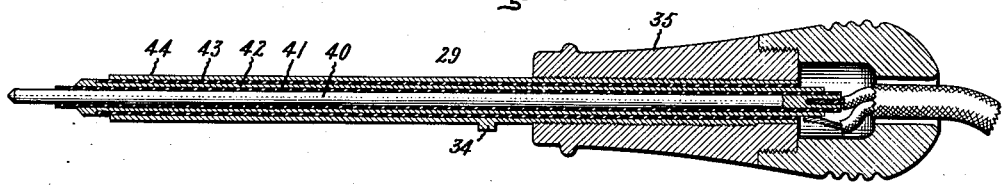

Figure 1 is a view partly in section of an electric switch embodying the novel features of my invention, Figs. 2, 3 and 4 are detail views of operating members for my switching device, Fig. 5 is a diagrammatic view of a polyphase system embodying the switching device of my invention and Figs. 6, 7 and 8 are diagrammatic views of a portion of the system of Fig. 5 showing my switching device in combination with the types of operating members shown in Figs. 2, 3 and 4.

In Fig. 1 is shown an electric switch embodying the features of my invention, mounted upon a suitable support 1. The switch mechanism is mounted in back of the support 1 and is operative from the front of the support through a tube 2 surrounded, on the front of the support 1, by an insulating protector 3 so that there are no live parts of the switch exposed and a switch of the "dead front" type provided. At the end of the tube 2 within the protector 3 is a holding or locking means consisting of a bayonet lock 4 adapted to coöperate with the operating member for the switch to hold such member in switch operating position. The opposite end of the tube 2 is threaded for a portion of its length and is screwed through a conducting plate 5, secured to the support, and provided with a terminal member 6 for the switch. Upon this end of the tube 2 is also threaded a member 7 provided with an offset portion 8. Threaded on the member 7 in contact engagement with the conducting plate 5 is a nut 9 and between the nut 9 and the offset portion 8 is an insulating spacer 10 serving to support one leg of a conducting member 11, which is substantially U-shaped in configuration, this leg of the member 11 carrying another terminal 12 for the switch. The other leg of the member 11 supports a main contact or reciprocating member 13 which is tubular in shape and slidably mounted in an opening through this leg of member 11 and in electrical engagement therewith. The tubular member 13 has an offset or engaging portion 14 and is biased by means of a spring 15 to be held in contact engagement with the portion 8 of member 7.

Within the tubular member 13 is a cylindrical insulating sleeve 16 closed at one end except for an opening through which extends a rod 17. The rod 17 or auxiliary contact member has secured at one end a head 18 having a concave face and at the other end a button or contact portion 19 which is separated from the end of the tubular member 13 by a washer 20 of insulating material. The rod 17 is independently movable with its head 18 slidable within the sleeve 16 and is biased by a spring member 21 to maintain the contact portion 19 in engagement with the washer 20.

Carried by the U-shaped member 11 is a supporting arm 22 insulated therefrom and carrying a pivotally supported contact member 23 having an arm 24 extending into the path of movement of the contact portion 19 of the reciprocating rod 17. The contact member 23 with its arm 24 is biased to normal position by a spring 25. Carried by the supporting arm 22 is a third terminal member 26 for the switch in electrical engagement therewith.

For operating this switching device, I provide three types of operating members or plugs 27, 28 and 29, as shown in Figs. 2, 3 and 4, respectively. The operating member 27, as shown in Fig. 2, is used when it is desired to test the current flowing in any conductor or to calibrate a measuring instrument in common to several conductors. This member comprises a metallic rod 30 terminating in a pointed head 31. Surrounding the rod 30 is an insulating sleeve 32 and surrounding the sleeve 32 is a metallic contact sleeve 33 which does not extend quite to the end of the sleeve 32. This sleeve 33 carries a lug 34 adapted to coöperate with the bayonet lock 4 on tube 2 of the switch. The rod 30 and sleeves 32 and 33 are secured in a handle member 35. Secured to the rod 30 and to the metallic sleeve 33 within the handle 35 are leads adapted to be connected to a portable testing instrument as best shown in Fig. 7, the rod 30 and sleeve 33 serving as terminals for the portable instrument.

Another type of operating member 28 for my switching device is shown in Fig. 3 which operates to transfer the common measuring instrument from one conductor or circuit of the system to another. This member comprises, secured to the handle member 35, a cylindrical casing 36 provided with the lug 34 and carrying at the end of the casing a metallic engaging member 37 having a shoulder portion and terminating in a pointed nose 38. The member 37 is set into casing 36 and riveted thereto being separated therefrom by an insulating sleeve 39 which extends beyond the end of the casing 36.

The third type of operating member 29, is shown in Fig. 4, this member operating the switch to combine the functions of operating members 27 and 28, that is, this member operates the switch to transfer the measuring instrument to the conductor desired and at the same time calibrates the instrument or tests the current flowing in the conductor. The operating member 29 comprises a handle member 35 which carries a plurality of tubular or cylindrical sleeves concentric with a metallic rod 40. These sleeves or casings consist of an insulating sleeve 41 in engagement with rod 40 which in turn is surrounded by a metallic casing 42. Surrounding the casing 42 is another insulating sleeve 43 and finally a metallic casing 44. The casing 44 is the shortest member, each successive inner sleeve or casing extending a little beyond the casing or sleeve immediately exterior to it. As in the other operating members, the outer metallic member 44 carries the lug 34 for coöperation with the bayonet lock 4. Leads from a portable measuring instrument extend through the handle 35 and are in contact with the rod 40 and sleeve 42, serving as terminals for the portable instrument.

The connection of my switching device to a polyphase circuit is shown in Fig. 5. This circuit consists of conductors 45, 46 and 47 to which is operatively related transformers 48, 49 and 50, respectively. For measuring the current in any of the transformers and hence in any conductor, I provide a common measuring instrument 51 operatively related to each transformer and to the switching devices. I have shown one of my switches corresponding to each conductor having their terminal members 12 connected to one end of their respective transformers through conductors 52 and their terminals 6 connected to common return conductors 53 and 54 for the transformers to which is also connected, at 55, one terminal of the measuring instrument 51. The other terminal of the instrument is connected to a common conductor 56 to which each of the terminals 26 for the switches are connected. As shown in Fig. 5, with the switches in normal position, the circuit of each transformer is normally closed through its respective switch, the circuit for the transformer 48, for instance, being traced from one side of the transformer along conductor 52 to terminal 12 of the switch, through the U-shaped member 11 to the tubular member 13, through the member 13 to its engaging portion 14, through the conducting plate 5 to terminal 6 and thence by conductors 54 and 53 back to the transformer. The common measuring instrument 51 is normally open circuited but is adapted to be connected in the circuit of any of the transformers.

The operation of my switching device may be described as follows, taken in connection with Figs. 6, 7 and 8 which are diagrammatic views of one conductor of the system shown in Fig. 5 with its corresponding switch. Let us assume first that it is desired to transfer or connect the measuring instrument 51 to one transformer, for instance, to transformer 48 and thereby to conductor 45. For this purpose, the operating member 28, shown in Fig. 3, called the transfer plug is inserted in the tube 2 for the switch corresponding to conductor 45. The nose 38 thereof first engages the end of rod 17 and forces it against the action of its spring 21 to move its contact portion 19 into engagement with the arm 24 of contact member 23. At the same time the shoulder portion of member 37 on the operating member engages the contact portion 14 of tubular member 13. The engagement of members 19 and 23 connects the measuring instrument 51 in circuit with the transformer 48 as shown in Fig. 6 as follows: from transformer 48 through conductor 53 to the point 55 thence through the instrument 51, conductor 56 to terminal 26 of the switch, thence through member 22, contact member 23, arm 24, contact portion 19 and rod 17, to the nose 38 of the operating member and thence by means of member 37 through the tubular member 13, U-shaped member 11, terminal 12 and along conductor 52 back to the transformer. The instrument 51 is thereby in a shunt circuit between the junction point 55 and the tubular member 13 as the normal circuit through the switch also exists between the point 55, to terminal 6 through conducting plate 5 to the tubular member 13. Due to the insulation 39 there is no connection in the operating member 28 between the sleeve 36 and the member 37. Upon further movement of the transfer plug 28 in switch operating direction, the shoulder of member 37 forces the tubular member 13 out of engagement with the conducting plate 5 taking the position shown in Fig. 6 and hence opens the last mentioned normal circuit through the switch at this point, instrument 51 being now included in series with transformer 48. This further movement of the plug 28 causes rod 17 to merely move the member 23 about its pivot. It is thus apparent that the measuring instrument 51 is connected in circuit with the transformer to be tested without open circuiting the transformer.

When the operating member 28 reaches the limit of its switch operating movement, by rotation of the handle 35 in the tube 2, the lug 34 engages the bayonet lock 4 and the plug 28 is restrained in switch operating position. In moving the operating member 28 out of switch operating position, the member 37 thereof permits the tubular member 13 and plate 5 to first come into electrical engagement by the action of the spring 15 thereby preventing open circuiting the transformer and then due to the spring 21 engagement is broken between the contact portion 19 of rod 17 and arm 24. In a similar manner, the instrument 51 may be transferred to the circuit of any other transformer or conductor by insertion of the operating member 28 in the tube 2 of the switch corresponding to that conductor.

Let us assume that it is desired to test the current flowing in any one of the conductors 45, 46 or 47, for instance, conductor 46 and assume that no instrument is used in common to the conductors as shown in Fig. 7. For this purpose, operating member or testing plug 27 carrying a portable measuring instrument 57 is inserted in the tube 2 of the switch corresponding to conductor 46. The circuit of the transformer 49 is normally closed through the switch as has been described. The insertion of this plug does not engage the rod 17 but the conducting head 31 on rod 30 engages the engaging portion 14 of tubular member 13 and completes a shunt circuit between the conducting plate 5 and the member 13 as follows, from the conducting plate 5 along sleeve 33 forming one terminal of the portable instrument 57, through the instrument and thence by rod 30 to head 31 forming the other terminal of the portable instrument, to the tubular member 13. As the plug 27 reaches the limit of its switch operating movement, the head 31 on rod 30 separates the member 13 from the plate 5 and the normal circuit through the switch is broken and the portable instrument 57 thereby connected in series with the transformer 49, as shown in Fig. 7, the instrument being connected between conducting plate 5 and the tubular member 13. In a similar manner as described this member may be locked in switch operating position and the current in any conductor tested by operating the proper switch. Due to the movement of the tubular member 13, the contact portion 19 of the rod 17 engages arm 24, but as the terminal 26 is disconnected nothing happens.

Assume that it is desired to transfer the common instrument 51 to a certain conductor, for instance, conductor 47 and, at the same time, test the accuracy or calibrate the instrument 51. For this purpose, operating member 29 which is a combined testing and transfer plug, as shown in Fig. 4, with a portable measuring instrument 57 is inserted in the tube 2 of the proper switch as shown in Fig. 8. In this instance, the end of rod 40 first engages rod 17 and the end of sleeve 42 engages the head 14 of tubular member 13. The rod 40 thereby moves rod 17 to carry its contact portion 19 into engagement with arm 24 to transfer the instrument 51 to the circuit of transformer 50 corresponding to conductor 47. The circuit is thereby completed from the transformer 50 along conductor 53 to the point 55 through the instrument 51, conductor 56, terminal 26 of the switch, member 22, contact member 23, arm 24, contact portion 19, rod 17, to rod 40 of the operating member, forming one terminal of the portable instrument, along the rod 40 through the portable instrument 57 and back along sleeve 42, forming the other terminal of the instrument 57, to head 14 of tubular member 13, and thence along member 13, through the U-shaped member 11, terminal 12 and conductor 52 to the transformer. This circuit from the junction point 55 to the tubular member 13 is in shunt to the normal circuit through the switch, as has been described. The instruments 51 and 57 are thereby connected in series in this shunt circuit. As the plug 29 reaches the limit of its switch operating movement, the head 14 of tubular member 13 is forced by the shoulder on sleeve 42 out of engagement with the conducting plate 5 and the normal circuit through the switch is broken at this point, leaving the instruments 51 and 57 in series with the transformer. In a similar manner as described plug 29 may be locked in this position. By comparing the reading of instrument 51 with the reading of the portable instrument 57, the former may be calibrated and at the same time the conductor may be tested.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. The combination with a plurality of conductors, transformers operatively related thereto, a measuring instrument in common to said transformers, and means for connecting said common instrument in the circuit of any transformer and simultaneously testing said instrument.

2. In combination with a plurality of conductors, a common measuring instrument, switching devices corresponding to said conductors and operatively related to said measuring instrument, and means operating said devices to either transfer said measuring instrument from one conductor to another, test said instrument, or perform said functions simultaneously.

3. In combination with a support, switching devices mounted on the back of said support and operable from the front thereof, a plurality of conductors, transformers connected thereto and operatively related to said switching devices, a common measuring instrument operatively related to said switching devices, and means for operating said switches from the front of said support to connect said instrument in series with any transformer, test said instrument or perform said functions in one operation.

4. The combination with a plurality of conductors, transformers operatively related thereto, a measuring instrument in common to said transformers, switching devices corresponding to each of said transformers comprising conducting members normally forming a closed path through each device, terminal members therefor carried by each switching device connected to said corresponding transformers, a third terminal carried by each switching device connected to said common instrument, and means whereby a conducting path may be completed from said third terminal to one of said other terminal members.

5. In combination with a plurality of conductors, transformers connected thereto, a common measuring instrument, and switching devices operatively related to said instrument and said transformers each comprising two coöperating contact members biased to engagement for closing a circuit through one of said transformers, two coöperating auxiliary contact members biased to disengagement to maintain a shunt circuit including said common instrument open, and means coöperating with said switches for first moving said auxiliary contact members into engagement to connect said common instrument to the circuit of its corresponding transformer, and then moving said first mentioned coöperating contacts out of engagement.

6. The combination with a plurality of transformers, a common measuring instrument therefor, a switching device normally closing the circuit of each of said transformers, a normally open shunt circuit for each switch including said common instrument, and detachable means for operating said switches to first close said shunt circuit to connect said instrument to its respective transformer and then opening said normally closed circuit.

7. In combination with a switching device comprising main terminals, members providing a normally closed conducting path between said terminals, an auxiliary terminal, and members providing a normally open conducting path between said auxiliary terminal and one of the members of said normally closed path, of a transformer connected between said main terminals, a measuring instrument connected to said auxiliary terminal, and members detachably related to said switching device for closing said normally open path through said switch and then opening said normally closed path to connect said instrument in series with said transformer.

8. A switching device comprising two main coöperating contact members, means normally holding said members in engagement to close a conducting path through the switch, two auxiliary coöperating contact members adapted to close a circuit in shunt to said conducting path, means for normally holding said members out of engagement, and means operating said switch to first move said auxiliary contact members into engagement to close said shunt path and then move said main contact members out of engagement to open said conducting path.

9. A switching device comprising two fixed terminals, members forming a normally closed conducting path between said terminals, a third terminal, members forming a normally open conducting path between said third terminal and one of said fixed terminals, an independent member operative to close said normally open conducting path and open said normally closed conducting path, and a second independent member adapted to replace said first mentioned member closing said normally open conducting path through a measuring instrument.

10. A switching device comprising a terminal, a fixed conducting member connected thereto, a slidably actuated member in conductive relation with said fixed member, two terminals, means normally completing a conducting path between said slidably actuated member and one of said two terminals, means normally forming an open circuited conducting path between said slidably actuated member and the other of said two terminals, and a plurality of independent operating members for opening and closing said conducting paths in a definite sequence.

11. In combination with a transformer, and a measuring instrument, of a normally closed circuit including said transformer, two main coöperating contacts in said circuit biased to engagement, a normally open circuit in shunt to said transformer including two auxiliary contacts biased to disengagement, and a common member for controlling said main and auxiliary contacts operative to first move said auxiliary contacts into engagement and then move said main contacts out of engagement.

12. A switching device comprising two concentrically disposed slidably mounted contacts insulated from each other, a fixed contact with which one of said slidable contacts is biased to engage, a coöperating contact with which the other of said slidable contacts is biased to disengage, and a common operating member adapted to first move said other slidable and coöperating contacts into engagement and then said fixed and first mentioned slidable contacts out of engagement.

13. The combination with a plurality of transformers, a normally closed circuit for the secondary of each transformer including two contacts biased to engagement, a common measuring instrument, a shunt circuit to each transformer secondary including said instrument, contacts in each shunt circuit normally biased to disengagement to maintain said circuits open, a supporting structure for said contacts, and a common means for first moving said normally disengaged contacts into engagement and then said normally engaged contacts out of engagement to include said instrument in the circuit of any transformer secondary without open circuiting the secondary, including a second instrument in series with the contacts so disengaged or performing both operations simultaneously.

14. A switching device comprising a U-shaped conducting member, a conducting supporting means for said member insulated therefrom, a slidably actuated conducting member carried by said U-shaped member and biased to engage said supporting means, a second slidably actuated member within said first mentioned slidable member and insulated therefrom, and a movable contact member supported by said U-shaped member and insulated therefrom in the path of movement of said second slidable member.

In witness whereof, I have hereunto set my hand this 24th day of July, 1917.

CHARLES T. HENTSCHEL.